Feb. 12, 1924.  
H. G. RUNNE  
1,483,598  
CASTER WHEEL  
Filed March 21, 1922
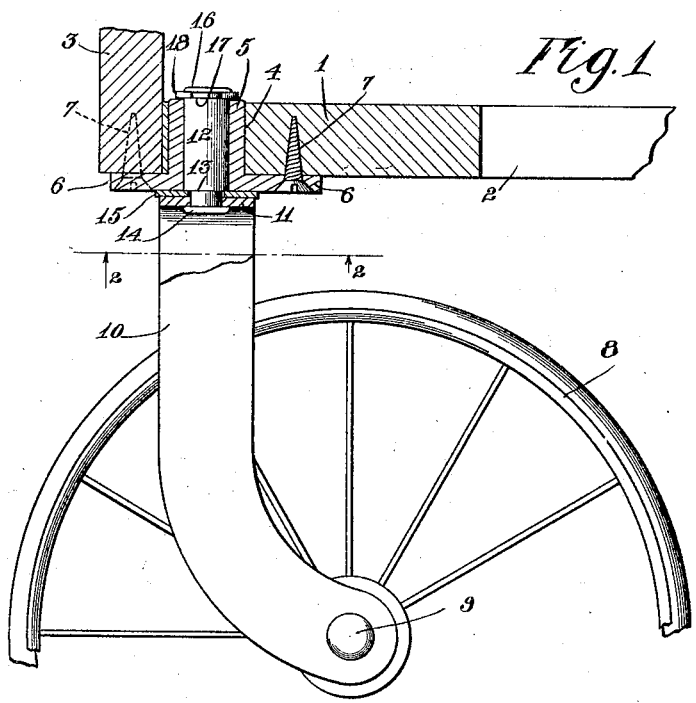
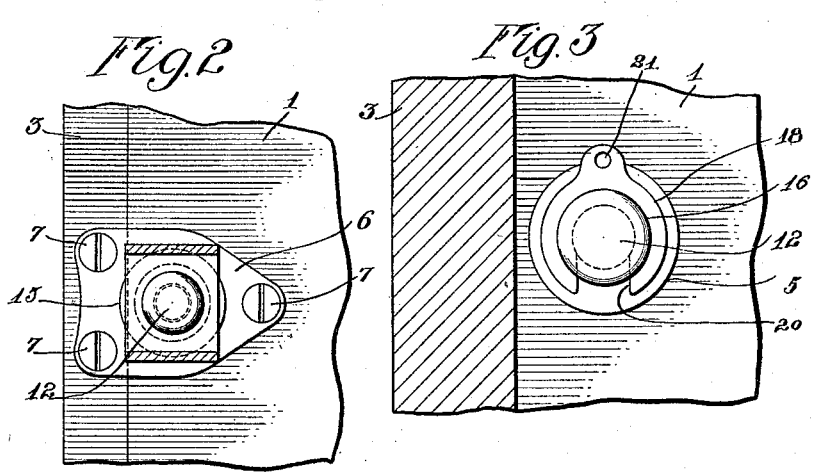
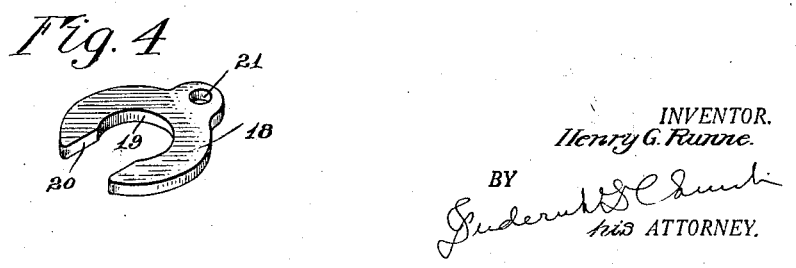
INVENTOR.  
*Henry G. Runne.*  
BY  
*his* ATTORNEY.

Patented Feb. 12, 1924.

1,483,598

UNITED STATES PATENT OFFICE.

HENRY G. RUNNE, OF ROCHESTER, NEW YORK, ASSIGNOR, BY DIRECT AND MESNE ASSIGNMENTS, TO E. MAURICE TRIMBLE, OF ROCHESTER, NEW YORK.

CASTER WHEEL.

Application filed March 21, 1922. Serial No. 545,535.

*To all whom it may concern:*

Be it known that I, HENRY G. RUNNE, of Rochester, in the county of Monroe and State of New York, have invented certain new and useful Improvements in Caster Wheels; and I do hereby declare the following to be a full, clear, and exact description of the same, reference being had to the accompanying drawing, forming a part of this specification, and to the reference numerals marked thereon.

My present invention relates to furniture, and more particularly to such articles of furniture as are mounted upon wheels to be moved about, and it has for its object to provide an improved swivel wheel or caster for such uses and one particularly adapted for use on children's cribs. The improvements are directed in part toward improving the bearing connection between the caster wheel and the crib or other article of furniture to give it strength and durability coupled with ease of operation and toward providing a simple and inexpensive means for locking the caster in place, which means permits the caster to be quickly assembled with or detached from the crib. To these and other ends the invention consists in certain improvements and combinations of parts, all as will be hereinafter more fully described, the novel features being pointed out in the claims at the end of the specification.

In the drawings:

Figure 1 is a fragmentary side elevation of a caster wheel constructed in accordance with and illustrating one embodiment of my invention, parts of the structure being broken away and other parts being shown in vertical section;

Figure 2 is a horizontal section on the line 2—2 of Figure 1 looking in the direction of the arrow;

Figure 3 is a top view of the swivel, and

Figure 4 is a detail perspective view of the locking washer.

Similar reference numerals throughout the several views indicate the same parts.

Referring to Figure 1, it may be assumed that 1 and 2 indicate the side and end rails of the bottom frame of the crib bed and 3 one of the side panels thereof. In the practice of my invention I bore a vertical hole 4 through one of these elements and fit closely therein a bushing 5. The lower end of the bushing is flanged at 6 to provide an extended bearing surface which also forms an attaching means to receive screws 7 by means of which the bushing is held in the frame piece. The bushing is of sufficient height, preferably, to extend entirely through the frame piece and come out flush or nearly so on its upper side.

The caster wheel 8 in the present instance, is a large rubber tired wheel, such as is usually employed to support a crib bed well up from the floor. It turns on an axle 9 extending between the lower ends of the arm of an axle yoke 10. The horizontal connecting portion 11 at the top of the yoke carries a vertical stud 12 which is riveted therein, the yoke being confined between the shoulder 13 on the stud and a headed portion 14. A washer 15 is preferably interposed to lie on the top of the yoke and is held tightly in place by the riveting. A stud 12 occupies the bearing provided by the bushing in which it turns freely on a vertical axis offset from the relatively transverse axis of the axle 9 in the manner of a caster and the washer 15 turns against the extended bearing surface on the under side of the bushing.

The upper end of the stud 12 projects slightly above the upper end of the bushing where it terminates in a head 16 above a shoulder 17 that is approximately flush with the upper end of the bushing, the head and shoulder leaving an intermediate reduced portion. Upon this reduced portion is snapped a spring locking clip 18 of the form shown in detail in Figure 4. The central opening 19 of this clip is the size of the reduced portion of the stud while a connecting slot 20 that bifurcates the clip is slightly narrower than the diameter of the reduced portion so that the clip spreads slightly when applied to the stud and then springs back into place in a manner that holds it tight upon the reduced portion. An eye 21 is preferably formed on the clip as a convenience in using a hook or other tool in removing the clip when desired. The clip thus retains the stud of the axle yoke in its bearing in the bushing and rides against the upper end of the latter when the wheels are lifted from the floor.

The caster constructed in accordance with my invention is strong and durable, and very easy to assemble, or to detach, which operation can be accomplished by unskilled persons which is convenient in shipping the cribs or other articles in a knock-down state.

I claim as my invention:

1. In furniture, the combination with a frame piece having a bushing therein provided with an extended bearing surface on its under side, of a wheel, an axle yoke supported thereby and upon which the said bearing surface rests, a stud fixed to the yoke and extending rotatably through the bushing to project from the upper side thereof, such projecting portion being provided with a head, and a spring locking clip embracing the stud beneath the head, said clip being of a bifurcated formation permitting it to be snapped into or out of engaging position.

2. In furniture, the combination with a frame piece having a vertical bearing therein, of a wheel, an axle yoke supported thereby and upon which the yoke rests, a stud fixed to the yoke and extending rotatably through the frame piece to project from the upper side thereof such projecting portion being provided with a head, and a spring locking clip embracing the stud beneath the head, said clip being of a bifurcated formation permitting it to be snapped into or out of engaging position.

HENRY G. RUNNE.